(12) United States Patent
Lin et al.

(10) Patent No.: US 11,121,572 B2
(45) Date of Patent: Sep. 14, 2021

(54) CHARGE SERVICE METHOD AND CHARGE SERVICE SYSTEM CAPABLE OF PROVIDING OPTIMAL SERVICE CONFIGURATIONS

(71) Applicant: ITE Tech. Inc., Hsinchu (TW)

(72) Inventors: Chun-Wen Lin, Hsinchu County (TW); Ming-Hsun Sung, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 317 days.

(21) Appl. No.: 16/245,197

(22) Filed: Jan. 10, 2019

(65) Prior Publication Data

US 2020/0083734 A1    Mar. 12, 2020

(30) Foreign Application Priority Data

Sep. 6, 2018  (TW) .................................. 107131243

(51) Int. Cl.
| | |
|---|---|
| *H02J 7/00* | (2006.01) |
| *H02J 50/80* | (2016.01) |
| *G07F 17/00* | (2006.01) |
| *H02J 7/04* | (2006.01) |

(52) U.S. Cl.
CPC ........ *H02J 7/0071* (2020.01); *G07F 17/0021* (2013.01); *H02J 7/042* (2013.01); *H02J 50/80* (2016.02)

(58) Field of Classification Search
CPC ........................................................ H02J 7/00
See application file for complete search history.

(56) References Cited

U.S. PATENT DOCUMENTS

| | | | |
|---|---|---|---|
| 2013/0169220 A1* | 7/2013 | Karner .................. | B60L 53/64 320/108 |
| 2014/0239733 A1 | 8/2014 | Mach | |

FOREIGN PATENT DOCUMENTS

| | | |
|---|---|---|
| CN | 104331797 A | 2/2015 |
| TW | M525019 U | 7/2016 |
| TW | M562509 U | 6/2018 |

* cited by examiner

Primary Examiner — Robert Grant
(74) Attorney, Agent, or Firm — Winston Hsu

(57) ABSTRACT

A charging service method includes transmitting information of a communication device to a charging station, transmitting information of the charging station to the communication device, acquiring available service information of the charging station from a charging station server according to the information of the charging station, selecting at least one service option for generating charging service information, transmitting the charging service information to the charging station server, generating charging station certification information to the communication device, relaying the charging station certification information from the communication device to the charging station, and enabling a charging function of the charging station to charge the communication device after the charging station certification information is received by the charging station.

12 Claims, 3 Drawing Sheets

CHARGE SERVICE METHOD AND CHARGE SERVICE SYSTEM CAPABLE OF PROVIDING OPTIMAL SERVICE CONFIGURATIONS

BACKGROUND OF THE INVENTION

1. Field of the Invention

The present invention illustrates a charge service method and a charge service system, and more particularly, a charge service method and a charge service system capable of providing optimal service configurations.

2. Description of the Prior Art

With rapid advancement of technologies, various portable electronic products such as notebooks, tablets, mobile phones, digital cameras, and personal digital assistants become popular. Power sources of these electronic products are generally in form of rechargeable lithium batteries. Thus, the portable electronic products can provide high mobility service since they can be operated at any place. Particularly, since the rechargeable battery can be regarded as a reusable energy storage device with high density of energy distribution, in order to increase a charging efficiency and a charging stability while satisfying various security regulations, charging modes of the electronic products are gradually upgraded.

Nowadays, several charging modes have been applied to different charging functions for the electronic products. For example, a wired charging mode and a wireless charging mode are two major categories. Further, many types of the wired charging mode are also introduced, such as one using universal serial bus (USB) for charging power, one using micro-USB for charging power, one using mini universal serial bus (mini-USB) for charging power in low-speed, or one using a Qualcomm fast charging mode through USB Type-C port for charging power (i.e., Fast Charge 2.0 and Fast Charge 3.0 standard, or say "Quick Charge 2.0/3.0"). In the wireless charging mode, penetration of electromagnetic waves can be used for charging power of the electronic product in a non-contact manner. Nowadays, the wireless charging mode also has many standards, such as a Qi wireless charging standard. Since the electronic products and power banks can be charged by using various charging modes, they are designed to include several wired or wireless charging ports for providing high compatible of connecting external power sources for a user. For example, the smart phone includes the wireless charging mode which supports the Qi wireless charging standard, and the wired charging mode of the Qualcomm fast charging standard with the USB Type-C port. Therefore, the user can charge power (batteries) of smart phone by using different standards of power supplies.

Since the electronic product can extend operation time for performing functions by charging its power, for convenience, a charging station marketing company can allocate many charging stations at many places. A typical charging station can support aforementioned wired charging and wireless charging modes. After the user completes a payment process, the user can charge power of the electronic product under a supported (or a selected) charging mode. For example, the user can use a coin-operated transaction in order to confirm all charging service options of the charging station. However, current charging stations are unable to customize advanced charging options corresponding to user's electronic products. For example, the user cannot set advanced charging options such as a power level, a charging time, and a user-defined charging price upper bound. Further, a typical charging station lacks of performing an internet function of connecting to a network. Thus, the charging station currently used can be regarded as an isolated power machine and cannot feedback a service status of the charging station to the charging station marketing company. Since the charging station marketing company cannot obtain the service status of each charging station, it is unable to acquire utilization status and history of the charging station. Therefore, the charging station marketing company is hard to quantify commercial activity of the charging station by counting, controlling, and managing a usage rate of the charging station.

SUMMARY OF THE INVENTION

In an embodiment of the present invention, a charging service method is disclosed. The charging service method comprises transmitting information of a communication device to a charging station, transmitting information of the charging station to the communication device after the information of the communication device is received by the charging station, acquiring available service information of the charging station from a charging station server according to the information of the charging station after the information of the charging station is received by the communication device, selecting at least one service option for generating charging service information after the available service information of the charging station is acquired by the communication device, transmitting the charging service information from the communication device to the charging station server, generating charging station certification information to the communication device after the charging service information is received by the charging station server, relaying the charging station certification information from the communication device to the charging station after the charging certification information is received by the communication device, and enabling a charging function of the charging station to charge the communication device or an electronic device designated by the communication device after the charging station certification information is received and verified by the charging station.

In another embodiment of the present invention, a charging service system is disclosed. The charging service system comprises a communication device, a charging station, and a charging station server. The communication device is configured to link to a network. The charging station is linked to the communication device and configured to provide a charging service. The charging station server is linked to the communication device through the network and configured to manage the charging service of the charging station. The communication device transmits information of the communication device to the charging station. The charging station transmits information of the charging station to the communication device after the information of the communication device is received by the charging station. The communication device acquires available service information of the charging station from the charging station server according to the information of the charging station after the information of the charging station is received by the communication device. The communication device selects at least one service option for generating charging service information after the available service information of the charging station is acquired by the communication device. The communication device transmits the charging service information to the charging station server. The charging station server generates charging station certification information to the communication device after the charging service information is received by the charging station server. The communication device relays the charging station certification information to the charging station after the charging certification information is received by the communication device. The charging station enables a charging function for proving the charging service in order to charge the communication device or an electronic device designated by the communication device after the charging station certification information is received and verified by the charging station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
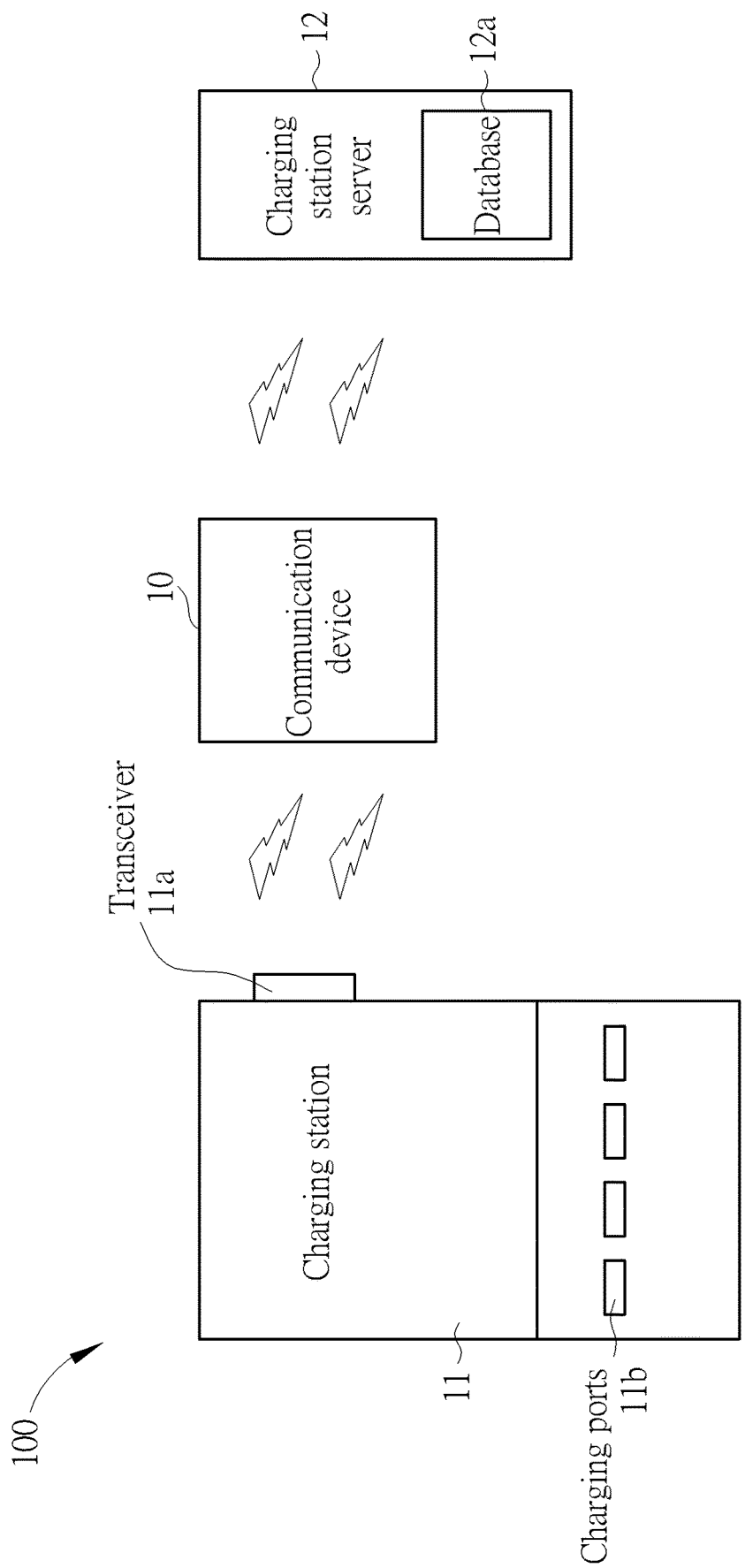
FIG. 1 illustrates a block diagram of a charging service system according to the embodiment of the present invention.

FIG. 1 illustrates a block diagram of a charging service system 100 according to the embodiment of the present invention. The charging service system 100 includes a communication device 10, a charging station 11, and a charging station server 12. The communication device 10 is used for establishing a link to a network. For example, the communication device 10 can be a smartphone, a notebook, a tablet, a personal digital assistant, or any portable electronic product. Since the communication device 10 is capable of performing network connection, the communication device 10 can access data from the network through a wireless link or a wired link. For example, the communication device 10 can establish a link for accessing data by using a Wi-Fi protocol, a Bluetooth protocol, a near field communication (NFC) protocol, and/or an internet of things (IoT) protocol. Further, an application program can be installed in the communication device 10 for providing a service platform of the charging service system 100 in order to set all parameters of charging service by a user. In the charging service system 100, the communication device 10 can be regarded as an "electronic device prepared to be charged". In the charging service system 100, the charging station 11 can be used for charging power (or say, batteries) of the communication device 10. However, the charging station 11 is not limited to charging power of the communication device 10. For example, the communication device 10 can be regarded as a device for setting all charging parameters. The charging station 11 can charge power of an electronic device (i.e., for example, a notebook) designated by the communication device 10. In the embodiment, the charging station 11 is linked to the communication device 10 for providing a charging service. The charging station 11 can be regarded as a power supply with a plurality of charging ports 11b for providing various charging modes. For example, the charging station 11 can support a wired charging mode and a wireless charging mode. In the wired charging mode, the charging ports 11b of the charging station 11 can include a universal serial bus (USB) charging port, a micro universal serial bus (Micro-USB) charging port, and a mini-universal serial bus (Mini-USB) charging port, a lightning charging port, and a USB Type-C charging port. In the wireless charging mode, the charging ports 11b of the charging station 11 can include a wireless charging port of the Qi standard. Any reasonable hardware modification of the charging ports 11b of the charging station 11 falls into the scope of the present invention. The charging station 11 can also include a transceiver 11a. The transceiver 11a can support short-term wireless communication protocols, such as near-field communication (NFC) protocol, Wi-Fi protocol, or Bluetooth protocol. The transceiver device 11a can also be a wired transceiver device. For example, the transceiver device 11a can be a wired data transmission port for accessing data through a wired connection (or link). The charging station server 12 is linked to the communication device 10 through the network for managing the charging service of the charging station 11. In other words, in the charging service system 100, the communication device 10 can communicate with the charging station 11 by using a short-term wireless link or a wired communication link through the transceiver device 11a. The communication device 10 can also communicate with the charging station server 12 through the network. Therefore, the charging station server 12 can control and manage operations of the charging station 11 through the application program installed in the communication device 10. Further, the charging station server 12 can acquire service history of the charging station 11. The charging station server 12 can be a network server, a cloud server, or a data control center of the charging station marketing company. The charging station server 12 can include a database 12a for saving information of the service history in order to generate a commercial analysis result of the charging station 11.

In the charging service system 100, the communication device 10 can transmit information of the communication device 10 to the charging station 11. The charging station 11 can transmit information of the charging station 11 to the communication device 10 after the information of the communication device 10 is received by the charging station 11. The communication device 10 can acquire available service information of the charging station 11 from the charging station server 12 according to the information of the charging station 11 after the information of the charging station 11 is received by the communication device 10. A user can use the communication device 10 for selecting at least one service option in order to generate charging service information after the available service information of the charging station 11 is acquired by the communication device 10. Then, the communication device 10 can transmit the charging service information to the charging station server 12. The charging station server 12 can generate charging station certification information to the communication device 10 after the charging service information is received by the charging station server 12. The communication device 10 can relay the charging station certification information to the charging station 11 after the charging certification information is received by the communication device 10. The charging station 11 can enable a charging function for proving the charging service in order to charge the communication device 10 (or an electronic device designated by the communication device 10) after the charging station certification information is received and verified by the charging station 11. A charging service method performed by the charging service system 100 is illustrated later.

Figure 2A:
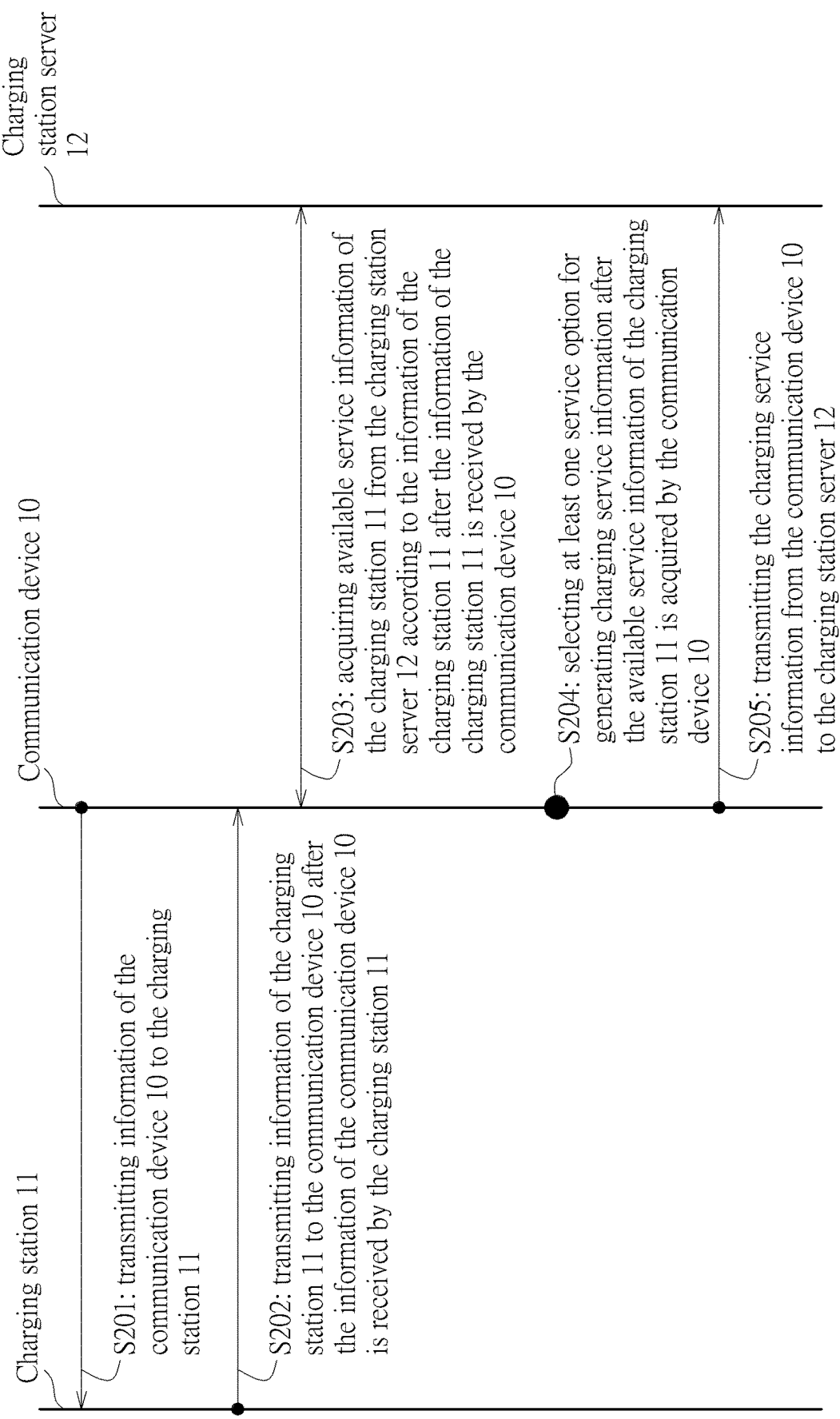
FIG. 2A is an illustration of a first part of performing a charging service method by the charging service system in FIG. 1.
Figure 2B:
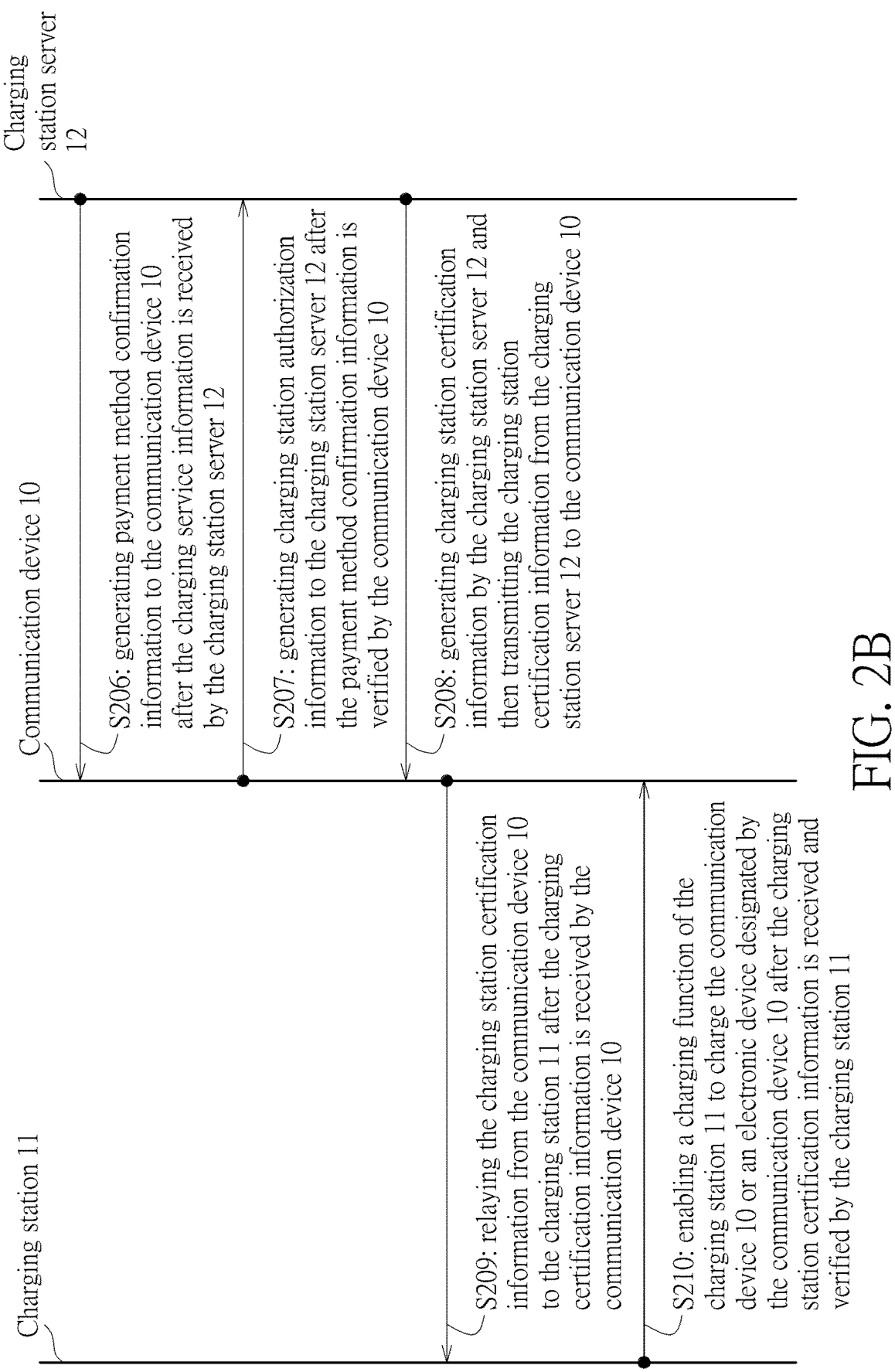
FIG. 2B is an illustration of a second part of performing the charging service method by the charging service system in FIG. 1.

FIG. 2A is an illustration of a first part of performing a charging service method by the charging service system 100. FIG. 2B is an illustration of a second part of performing the charging service method by the charging service system 100. The charging service method can include step S201 to step S210. Any reasonable technology modification falls into the scope of the present invention. Step S201 to step S210 are illustrated below.

step S201: transmitting information of the communication device 10 to the charging station 11;

step S202: transmitting information of the charging station 11 to the communication device 10 after the information of the communication device 10 is received by the charging station 11;

step S203: acquiring available service information of the charging station 11 from the charging station server 12 according to the information of the charging station 11 after the information of the charging station 11 is received by the communication device 10;

step S204: selecting at least one service option for generating charging service information after the available service information of the charging station 11 is acquired by the communication device 10;

step S205: transmitting the charging service information from the communication device 10 to the charging station server 12;

step S206: generating payment method confirmation information to the communication device 10 after the charging service information is received by the charging station server 12;

step S207: generating charging station authorization information to the charging station server 12 after the payment method confirmation information is verified by the communication device 10;

step S208: generating charging station certification information by the charging station server 12 and then transmitting the charging station certification information from the charging station server 12 to the communication device 10;

step S209: relaying the charging station certification information from the communication device 10 to the charging station 11 after the charging certification information is received by the communication device 10;

step S210: enabling a charging function of the charging station 11 to charge the communication device 10 or an electronic device designated by the communication device 10 after the charging station certification information is received and verified by the charging station 11.

In step S201, the communication device 10 transmits information of the communication device 10 to the charging station 11. For example, the application program of the communication device 10 can perform an automatic capturing process for generating at least one communication device hardware specification parameter. Then, the at least one communication device hardware specification parameter can be transmitted to the charging station 11. The at least one communication device hardware specification parameter can be defined as a battery capacity, a product specification, a list of supported charging ports, a list of supported charging modes, and/or configurations of operation system (OS) of the communication device 10. The application program of the communication device 10 can transmit the captured at least one communication device hardware specification parameter to the charging station 11 through a wireless link (i.e., such as a link with NFC protocol) or a wired link. The application program of the communication device 10 can also perform a manual input process for the user to input at least one communication device hardware specification parameter. Then, the at least one communication device hardware specification parameter can be transmitted to the charging station 11. Any reasonable hardware or technology modification falls into the scope of the present invention. In step S202, the charging station 11 can transmit information of the charging station 11 to the communication device 10 after the information of the communication device 10 is received by the charging station 11. For example, the charging station 11 can transmit its position information, identification code information, and current utilization status information to the communication device 10 after the information of the communication device 10 is received by the charging station 11. Specifically, the charging station 11 of the charging service system 100 can be regarded as a passive device. Therefore, the position information, the identification code information, and the current utilization status information of the charging station 11 can be read out by using the communication device 10 through the application program. The charging station 11 of the charging service system 100 can also be regarded as an active device. Therefore, the charging station 11 can actively transmit information (i.e., the position information, the identification code information, and the current utilization status information) to the communication device 10. In step S203, after the communication device 10 receives the information of the charging station 11, data of position coordinates, identification code, and current utilization status of the charging station 11 can be temporarily saved in the communication device 10. Then, the communication device 10 can acquire available service information of the charging station 11 from the charging station server 12 according to the information of the charging station 11 after the information of the charging station 11 is received by the communication device 10. For example, the communication device 10 can acquire information of at least one available service of a power level, a charging time, a charging price, a connection type, and a payment method of the charging station 11 from the charging station server 12 according to the information of the charging station 11. The communication device 10 can also notify these available service options to the user (i.e., displayed on the screen) for providing an advanced configuration service. In step S204, the user can select at least one service option through the application program of the communication device 10. The communication device 10 can generate charging service information accordingly. For example, the user can set power level equal to 2000 mA by using the power level option service, set charging time equal to 20 minutes by using the charging time option service, set connection type as a USB-Type C port under QC3.0 standard by using the connection type option service, and set payment method as a credit card payment by using the payment method option service. After the charging service information is generated by the communication device 10, the communication device 10 can transmit the charging service information to the charging station server 12 in step S205.

In step S206, the charging station server 12 can generate payment method confirmation information to the communication device 10 after the charging service information is received by the charging station server 12. A purpose of step S206 is to enhance security level of transactions in the charging service system 100. The user is required to confirm and authorize the charging station server 12 through the communication device 10 for providing the charging service of the charging station 11. Therefore, in step S207, the communication device 10 can generate charging station authorization information to the charging station server 12 after the payment method confirmation information is verified by the communication device 10. In step S208, the charging station server 12 can generate charging station certification information and then transmit the charging station certification information to the communication device 10. Particularly, the charging station certification information can be regarded as control signal information for controlling the charging station 11 to enable the charging service. Since the communication device 10 is linked to the charging station server 12 and the charging station 11, the communication device 10 can relay the charging station certification information from the communication device 10 to the charging station 11. For example, the communication device 10 can receive the charging station certification information transmitted from the charging station server 12 and then relay the charging station certification information to the charging station 11 through a wireless link with the NFC protocol. Then, in step S210, the charging station 11 can enable the charging function to charge the communication device 10 or the electronic device designated by the communication device 10 after the charging station certification information is received and successfully verified by the charging station 11. As previously mentioned, the communication device 10 can be regarded as the device for setting all charging parameters. Therefore, the charging station 11 can enable the charging function to charge the designated electronic device. For example, the user can input hardware information of a notebook to the communication device 10. Thus, in step S201, the information of the communication device 10 can further include the hardware information of the notebook. Therefore, the charging station server 12 can generate at least one service option for charging batteries of the notebook. By communicating the communication device 10 with the charging station server 12, finally, the charging station 11 can enable the charging function to charge the batteries of the notebook. Any reasonable technology modification or application falls into the scope of the present invention.

In FIG. 2A and FIG. 2B, the communication device 10 can be regarded as a relay node for communicating information between the charging station 11 and the charging station server 12 by using the application program. Further, the communication device 10 of the charging service system 100 is capable of performing mobile communications by establishing a wireless network link. Therefore, since the charging station 11 is linked to the communication device 10 through the short-term wireless link or the wired communication link, operations of the charging station 11 can be performed at any place. In other words, as long as the communication device 10 can establish the wireless network link to the charging station server 12 for performing mobile communications, the charging station server 12 can control the charging station 11 and can record service history of the charging station 11. Therefore, allocation place of the charging station 11 in the charging service system 100 is not limited. Further, the aforementioned steps can also be reasonably modified according to a business strategy of the charging station marketing company. For example, step S206 and step S207 can be pre-configured when the application program is installed in the communication device 10. For example, after the user selects at least one service option, the charging station server 12 can automatically deduct the charging fee by directly connecting with a credit card issuing bank. Then, the charging station server 12 can control the charging station 11 for providing the charging service in order to charge the communication device 10. Further, data can be transmitted under an encrypted channel in step S207 and step S208. In other words, the "charging station authorization information" in step S207 and the "charging station certification information" in step S208 can be encrypted. Thus, the transaction security of the charging service system 100 can be improved.

As previously mentioned, the charging station server 12 can acquire the utilization status of the charging station 11. Thus, the charging station server 12 can analyze commercial activities of the charging station 11. For example, the charging station server 12 can acquire a utilization status of the charging station 11 during a time period (i.e., during one month). The charging station server 12 can save data of the utilization status of the charging station 11 to the database 12a. Further, the charging station server 12 can generate a commercial analysis result of the charging station 11 according to the utilization status of the charging station 11 during the time period. For example, the charging station server 12 can record variations of a count of use, a frequency of use, a charging mode, and a payment mode of the charging station 11 during one month. The charging station server 12 can adjust the available service information or generate a request for reallocating position of the charging station 11 according to the commercial analysis result of the charging station 11 to increase commercial profit. For example, according to the commercial analysis result, if the charging station 11 located on a certain place is seldom used during one month, the charging station server 12 can inform relevant personnel to reallocate the charging station 11 on other location for optimizing service quality and commercial benefits of the charging service system 100.

To sum up, the present invention illustrates a charging service method and a charging service system. In the charging service system, the communication device can use an application program for communicating with the charging station through a short-term wireless link or a wired communication link. Thus, authorization and verification processes can be simplified, thereby providing convenient charging service for the user. Further, the charging station server of the charging service system can acquire a utilization status of the charging station. Thus, the charging station server can generate a commercial analysis result of the charging station according to the utilization status of the charging station during a time period. The charging station server can adjust the available service information or generate a request for reallocating position of the charging station according to the commercial analysis result of the charging station to increase commercial profit. In other words, the charging service system of the present invention can provide optimal service configurations and high quality of charging service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A charging service method comprising:
 transmitting information of a communication device to a charging station;
 transmitting information of the charging station to the communication device after the information of the communication device is received by the charging station;

acquiring available service information of the charging station from a charging station server according to the information of the charging station after the information of the charging station is received by the communication device;
selecting at least one service option for generating charging service information after the available service information of the charging station is acquired by the communication device;
transmitting the charging service information from the communication device to the charging station server;
generating payment method confirmation information to the communication device after the charging service information is received by the charging station server; and
generating charging station authorization information to the charging station server after the payment method confirmation information is verified by the communication device;
generating charging station certification information to the communication device after the charging service information is received by the charging station server;
relaying the charging station certification information from the communication device to the charging station after the charging certification information is received by the communication device; and
enabling a charging function of the charging station to charge the communication device or an electronic device designated by the communication device after the charging station certification information is received and verified by the charging station.

2. The method of claim 1, wherein an application program is installed in the communication device, and transmitting the charging service information from the communication device to the charging station is transmitting at least one communication device hardware specification parameter generated by using an automatic capturing process of the application program or by using a manual input process to the charging station.

3. The method of claim 1, wherein transmitting information of the charging station to the communication device after the information of the communication device is received by the charging station, is transmitting position information and/or an identification code of the charging station to the communication device after the information of the communication device is received by the charging station.

4. The method of claim 1, wherein acquiring available service information of the charging station from the charging station server according to the information of the charging station after the information of the charging station is received by the communication device, is acquiring information of at least one available service of a power level, a charging time, a charging price, a connection type, and a payment method of the charging station from the charging station server according to the information of the charging station after the information of the charging station is received by the communication device.

5. The method of claim 1, further comprising:
acquiring a utilization status of the charging station by the charging station server during a time period; and
generating a commercial analysis result of the charging station by the charging station server according to the utilization status of the charging station during the time period.

6. The method of claim 5, further comprising:
adjusting the available service information of the charging station by the charging station server according to the commercial analysis result of the charging station.

7. A charging service system, comprising:
a communication device configured to link to a network;
a charging station linked to the communication device and configured to provide a charging service; and
a charging station server linked to the communication device through the network and configured to manage the charging service of the charging station;
wherein the communication device transmits information of the communication device to the charging station, the charging station transmits information of the charging station to the communication device after the information of the communication device is received by the charging station, the communication device acquires available service information of the charging station from the charging station server according to the information of the charging station after the information of the charging station is received by the communication device, the communication device selects at least one service option for generating charging service information after the available service information of the charging station is acquired by the communication device, the communication device transmits the charging service information to the charging station server, the charging station server generates payment method confirmation information to the communication device after the charging service information is received by the charging station server, and the communication device generates charging station authorization information to the charging station server after the payment method confirmation information is verified by the communication device, the charging station server generates charging station certification information to the communication device after the charging service information is received by the charging station server, the communication device relays the charging station certification information to the charging station after the charging certification information is received by the communication device, and the charging station enables a charging function for proving the charging service in order to charge the communication device or an electronic device designated by the communication device after the charging station certification information is received and verified by the charging station.

8. The system of claim 7, wherein an application program is installed in the communication device, the application program performs an automatic capturing process or a manual input process for generating at least one communication device hardware specification parameter, and transmits the at least one communication device hardware specification parameter to the charging station.

9. The system of claim 7, wherein the charging station transmits position information and/or an identification code to the communication device after the information of the communication device is received by the charging station.

10. The system of claim 7, wherein the communication device acquires information of at least one available service of a power level, a charging time, a charging price, a connection type, and a payment method of the charging station from the charging station server according to the information of the charging station after the information of the charging station is received by the communication device.

11. The system of claim 7, wherein the charging station server acquires a utilization status of the charging station during a time period, and generates a commercial analysis result of the charging station according to the utilization status of the charging station during the time period.

12. The system of claim 11, wherein the charging station server adjusts the available service information of the charging station according to the commercial analysis result of the charging station.

* * * * *